United States Patent [19]
Saito et al.

[11] Patent Number: 5,897,146
[45] Date of Patent: Apr. 27, 1999

[54] FLEXIBLE PIPE CONNECTOR

[75] Inventors: Kikuo Saito; Takashi Takeda, both of Sanda, Japan

[73] Assignee: Yano Giken Co., Ltd., Japan

[21] Appl. No.: 08/648,724

[22] Filed: May 16, 1996

[30] Foreign Application Priority Data

Mar. 21, 1996 [JP] Japan .................................... 8-063992

[51] Int. Cl.$^6$ ..................................................... F16L 27/04
[52] U.S. Cl. .................................. 285/145.3; 285/148.19; 285/302; 285/321; 285/261
[58] Field of Search ..................................... 285/302, 165, 285/166, 145.3, 148.19, 261, 321

[56] References Cited

U.S. PATENT DOCUMENTS

| | | | |
|---|---|---|---|
| 2,848,255 | 8/1958 | Klein et al. | 285/321 X |
| 3,938,833 | 2/1976 | Miyaoka | 285/166 |
| 4,296,953 | 10/1981 | Nagao et al. | 285/321 X |
| 4,776,617 | 10/1988 | Sato | 285/166 X |
| 5,192,094 | 3/1993 | Hammamoto | 285/165 |
| 5,570,910 | 11/1996 | Highlen | 285/321 X |

FOREIGN PATENT DOCUMENTS

| | | | |
|---|---|---|---|
| 671103 | 9/1963 | Canada | 285/321 |
| 2304852 | 10/1976 | France | 285/321 |
| 932001 | 7/1963 | United Kingdom | 285/321 |
| 1156882 | 7/1969 | United Kingdom | 285/165 |

*Primary Examiner*—Dave W. Arola
*Attorney, Agent, or Firm*—Webb Ziesenheim Bruening Logsdon Orkin & Hanson, P.C.

[57] ABSTRACT

A flexible pipe connector including a first cylindrical member, a second cylindrical member to be inserted into the first cylindrical member, an annular restricting groove defined in an inner peripheral face of the first cylindrical member, an annular attaching groove defined in an outer peripheral face of the second cylindrical member and having a shorter length than the restricting groove in a direction of cylinder axis, a retaining member radially expandably and detachably fitted to the attaching groove for coming into contact with an end face of the restricting groove in the cylinder axis direction so as to restrict range of relative movement between the first and second cylindrical members in the cylinder axis direction. The outer peripheral face of the second cylindrical member and the inner peripheral face of the first cylindrical member are provided with a radial opposing distance therebetween determined so as to allow insertion and withdrawal of the retaining member. The connector also includes a radial-expansion restricting portion for preventing, through contact, a radially outward withdrawing movement of the retaining member from the attaching groove when the retaining member comes into contact, along the direction of the cylinder axis, against an end face of the restricting groove located on the side of an entrance opening of the first cylindrical member. At least mutually contacting portions respectively of the end face of the restricting groove and an end face of the retaining member are formed as faces extending substantially normal to the cylinder axis or tapered faces extending radially outward as approaching the entrance opening of the first cylindrical member.

9 Claims, 10 Drawing Sheets

FLEXIBLE PIPE CONNECTOR

BACKGROUND OF THE INVENTION

1. Field of the Invention

The present invention relates to a flexible pipe connector, and more particularly to a pipe connector including a first cylindrical member and a second cylindrical member inserted into the first cylindrical member, the first cylindrical member defining, in an inner peripheral face thereof, an annular restricting groove, the second cylindrical member defining, in an outer peripheral face thereof, an annular attaching groove having a shorter axial length than the annular restricting groove of the first cylindrical member, the attaching groove being detachably attached with a radially deformable retaining member for coming into contact with an axial end face of the restricting groove for restricting range of relative axial movement between the two cylindrical members, the outer peripheral face of the second cylindrical member and the inner peripheral face of the first cylindrical member being provided with a radial opposing distance therebetween determined so as to allow insertion and

2. Description of the Related Art

In assembling an flexible pipe connector of the above-noted type, first, the second cylindrical member is inserted into the first cylindrical member, when a leading end of the second cylindrical member is placed at an axially intermediate portion of the restricting groove defined in the inner peripheral face of the first cylindrical member. Then, through the annular gap formed between the outer peripheral face of the second cylindrical member and the inner peripheral face of the first cylindrical member, the retaining member which is being radially expanded is inserted from the leading end of the second cylindrical member to the attaching groove of the same. In this condition, the radially expanded condition of the retaining member is released to allow this retaining member to be reduced radially to elastically fit the attaching groove.

As described above, with this type of flexible pipe connector, the annular gap for insertion/withdrawal of the retaining member is formed between the outer peripheral face of the second cylindrical member and the inner peripheral face of the first cylindrical member. Therefore, an external force in the withdrawing direction generated in association with an earthquake or differential settlement affects both of the two cylindrical members which are un-withdrawably and expandably connected to each other within the movable range determined by the length of the restricting groove. In this, the retaining member fitted to the attaching groove of the second cylindrical member is strongly pressed in the axial direction against one end face of the restricting groove located on the side of the entrance opening of the first cylindrical member, when the retaining member is urged to elastically deform or expand radially, so that this retaining member may be inadvertently detached or withdrawn from the attaching groove of the second cylindrical member.

Figure 12:
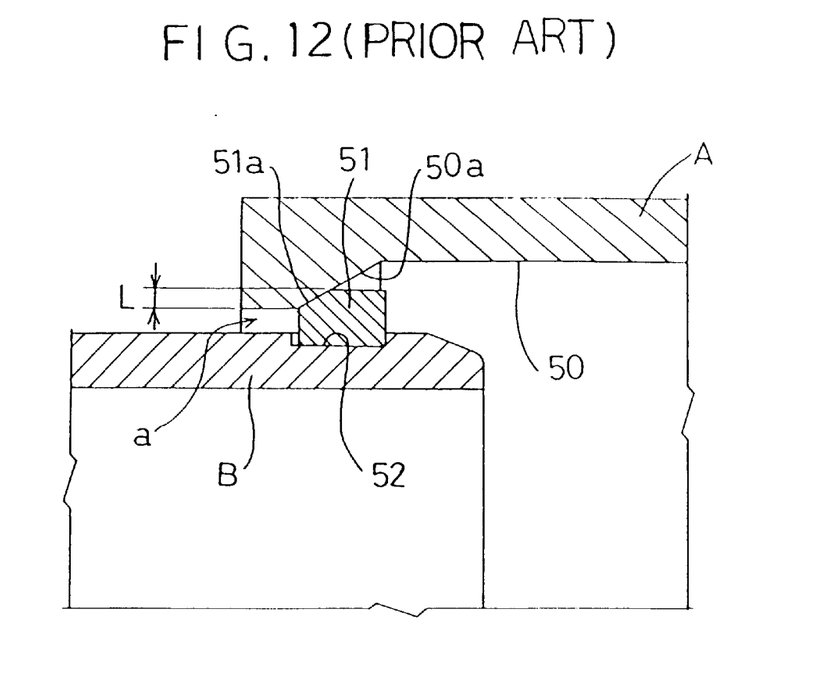
FIG. 12 is a section view showing principal portions of a conventional flexible pipe joint.

For this reason, a conventional flexible pipe connector has a construction shown in FIG. 12. In this construction, a contact face 50a of the restricting groove 50 and a contact face 51a of the retaining member 51 are formed respectively as a tapered face having a decreasing diameter toward the entrance opening (a) of the first cylindrical member A, so that these tapered contact faces 50a, 51a come into contact against each other in the axial direction when such withdrawing-direction external force is applied to the two cylindrical members A, B. And, the tapered contact face 50a of the restricting groove 50 has a minimum diameter which is same as or smaller than a minimum outside diameter of the tapered contact face 51a of the retaining member 51 (see Japanese unexamined utility model gazette No. 4-136392 for example).

In the case of the conventional flexible pipe connector having the above-described construction, when the withdrawing-direction external force is applied to the two cylindrical members A, B to cause the tapered face 51a of the retaining member 51 fitted to the attaching groove 52 of the second cylindrical member B and the tapered face 50a of the first cylindrical member A to come into contact against each other, the retaining member 51 is strongly pressed against the inner peripheral face of the attaching groove 52 of the second cylindrical member B. Thus, there occurs mutual sliding movement between the tapered face 51a of the retaining member 51 and the tapered face 50a of the first cylindrical member A. In association with this mutual sliding movement, the portion of the first cylindrical member A on the side of the entrance opening (a) thereof elastically deforms in the radially outward direction and the portion of the second cylindrical member B on the side of its inserted end side elastically deforms in the radially inward direction. And, if the sum of the amounts of these elastic radial deformations of the two cylindrical members exceeds a radial engagement width L between the tapered face 51a of the retaining member 51 and the tapered face 50a of the first cylindrical member A, the retained condition between the two cylindrical members A, B is forcibly released.

Therefore, in order to improve the retention condition between the cylindrical members A, B, it is necessary to increase the radial engagement width L between the tapered face 51a of the retaining member 51 and the tapered face 50a of the first cylindrical member A. But, such enlargement of this width tends to result in radial enlargement of the entire pipe connector.

The present invention attends to the above-described state of the art, and its primary object is to provide a flexible pipe connector which may be formed compact in the radial direction and which yet is capable of preventing inadvertent withdrawal of the two cylindrical members more effectively.

SUMMARY OF THE INVENTION

For accomplishing the above-noted object, a flexible pipe connector, according to the present invention, comprises:

a first cylindrical member;

a second cylindrical member to be inserted into the first cylindrical member;

an annular restricting groove defined in an inner peripheral face of the first cylindrical member;

an annular attaching groove defined in an outer peripheral face of the second cylindrical member and having a shorter length than the restricting groove in a direction of cylinder axis;

a retaining member radially expandably and detachably fitted to the attaching groove for coming into contact with an end face of the restricting groove in the cylinder axis direction so as to restrict range of relative movement between the first and second cylindrical members in the cylinder axis direction;

the outer peripheral face of the second cylindrical member and the inner peripheral face of the first cylindrical member being provided with a radial opposing distance therebetween determined so as to allow insertion and withdrawal of the retaining member;

a radial-expansion restricting portion for preventing, through contact, a radially outward withdrawing movement of the retaining member from the attaching groove when the retaining member comes into contact, along the direction of the cylinder axis, against an end face of the restricting groove located on the side of an entrance opening of the first cylindrical member;

wherein, at least mutually contacting portions respectively of the end face of the restricting groove and an end face of the retaining member are formed as faces extending substantially normal to the cylinder axis or tapered faces extending radially outward as approaching the entrance opening of the first cylindrical member.

According to the above-described construction, when the two cylindrical members flexibly and unwithdrawably connected to each other via the retaining member are subjected to an external force in the withdrawing direction due to an earthquake or differential settlement, these cylindrical members move relative to each other within the movable range defined by the length of the restricting groove, and the retaining member fitted to the attaching groove of the second cylindrical member comes into contact, along the direction of cylinder axis, against the one end face of the restricting groove located on the side of the entrance opening of the first cylinder member. In the course of this, the portion of the retaining member contacting against the one end face of the restricting groove of the first cylindrical member and the further portion of the retaining member contacting against the attaching groove of the second cylindrical member are radially displaced relative to each other. Further, at least those portion of the mutually contacting respective end faces of the restricting groove and the retaining member are formed as faces extending substantially normal to the cylinder axis or as tapered faces extending radially outward as approaching the entrance opening of the first cylindrical member. Thus, the retaining member is twisted and pivoted in a direction where a diagonal direction of a cross section of this retaining member is aligned with the cylinder radial direction, with using the portion of the retaining member contacting the end face of the restricting groove of the first cylindrical member and the further portion of the retaining member contacting the attaching groove of the second cylindrical member as reaction points for the pivotal movement. In the course of this twisting pivotal movement, the retaining member comes into contact with the radial-expansion restricting portion, whereby the retaining member may be reliably prevented from being withdrawn from the attaching groove.

Further, even if subjected to such withdrawing external force of a significant magnitude under the above condition, as long as the sum of the amount of the radially outward elastic deformation of the portion of the first cylindrical member on the side of the entrance opening thereof and the radially inward elastic deformation of the inserted portion of the second cylindrical member does not exceed the length of the diagonal line of the cross section of the retaining member, the retention condition between the two cylindrical members is not released.

Accordingly, since the radial length of the retaining member (consequently, the diagonal length of the cross section of this retaining member) functions effectively for preventing inadvertent withdrawal, the flexible pipe connector, according to the present invention, may be formed compact in the radial direction, yet may achieve superior withdrawal preventive effect, in comparison with the conventional construction described hereinbefore.

According to a further aspect of the invention, the radial-expansion restricting portion comprises a radial-expansion restricting face formed at an end of an inner peripheral face of the restricting groove in such a manner as to come into contact with or come closer to the outer peripheral face of the retaining member contacting against the end face of the restricting groove.

With the above construction, when a significant withdrawing force is applied to the two cylindrical members to bring the retaining member into contact against the one end face of the restricting groove, the radial-expansion restricting face of the radial-expansion restricting portion comes into contact with or comes closer to the outer peripheral face of the retaining member fitted to the attaching groove of the second cylindrical member. Therefore, a radial engagement width between this retaining member and the attaching groove of the second cylindrical member may be maintained at or near a predetermined engagement width.

Therefore, the withdrawing external force applied to the two cylindrical members may be received in a distributed state by the large mutually contacting portions of the end face of the retaining member and the one end face of the attaching groove of the second cylindrical member, respectively.

As a result, it is possible to reliably restrict damage due to decrease in the engagement width between the retaining member and the attaching groove of the second cylindrical member.

According to a still further aspect of the present invention, the radial-expansion restricting portion comprises a radial-expansion restricting face of a restricting member engaged and retained at one end of the inner peripheral face of the restricting groove in such a manner as to come into contact with or come closer to the outer peripheral face of the retaining member contacting against the end face of the restricting groove.

With the above-described construction, a conventional flexible pipe connector in which a radial mutual opposing distance between the outer peripheral face of the second cylindrical member and the inner peripheral face of the restricting groove of the first cylindrical member is set so as to allow insertion/withdrawal of the restricting member over the entire axial length of the restricting groove, may be modified to achieve the above-described effect, with such simple and economical modification for causing the restricting member to be engaged and retained at the one end of the inner peripheral face of the restricting groove of this pipe connector.

According to a still further aspect of the present invention, the outer peripheral face and the radial-expansion restricting face of the retaining member are formed respectively as a tapered face gradually reduced in the radial direction as approaching the entrance opening of the first cylindrical member.

With the above-described construction, in comparison with e.g. a further construction where the outer peripheral face and the radial-expansion restricting face of the retaining member are respectively formed parallel with the cylinder axis, the two cylindrical members may move more smoothly relatively to each other within the range defined by the length of the restricting groove, while the radial-expansion restricting face of the radial-expansion restricting portion is brought into contact with the outer peripheral face of the retaining member fitted to the attaching groove of the second cylindrical member when the retaining member comes into contact against the one end face of the restricting groove in association with application of withdrawing external force.

According to a still further aspect of the present invention, the restricting member is capable of radially inward bending deformation and this restricting member is engaged and retained, under a radially reduced condition, at the one end of the inner peripheral face of the restricting groove.

With this construction, the restricting member may be caused to be engaged and retained at the one end of the inner peripheral face of the restricting groove, by utilizing the radially inward elastic resilience of this restricting member per se. Accordingly, this construction provides the advantage of facilitating the process needed for causing the restricting member to be engaged and retained at a predetermined position within the restricting groove.

According to a still further aspect of the present invention, an intermediate portion of the restricting groove of the first cylindrical member relative to the cylinder axis is formed as a radially bulging portion.

With this construction, in assembling this flexible pipe connector, when the second cylindrical member is inserted into the first cylindrical member to bring the leading end of the second cylindrical member to the bulging portion of the first cylindrical portion, there is created a large annular space between the end side of the outer peripheral face of the second cylindrical member and the axially intermediate portion of the inner peripheral face of the restricting groove. Accordingly, through this large annular space, the radially expanded retaining member may be readily inserted from the leading end to the attaching groove of the second cylindrical member. In this manner, the efficiency of the connector assembly operation may be improved.

Further and other objects, features and effects of the invention will become more apparent from the following more detailed description of the embodiments of the invention with reference to the accompanying drawings.

BRIEF DESCRIPTION OF THE DRAWINGS

FIG. 6 is a vertical section view showing a flexible pipe connector according to a third preferred embodiment of the present invention, in which, FIG. 7 is a vertical section view showing an flexible pipe connector according to a fourth preferred embodiment of the present invention, in which, FIG. 10 shows a flexible pipe connector according to a sixth preferred embodiment of the present invention, in which.

DETAILED DESCRIPTION OF THE PREFERRED EMBODIMENTS

Preferred embodiments of an flexible pipe joint relating to the present invention will now be described in details with reference to the accompanying drawings.

[First Embodiment]

Figure 1:
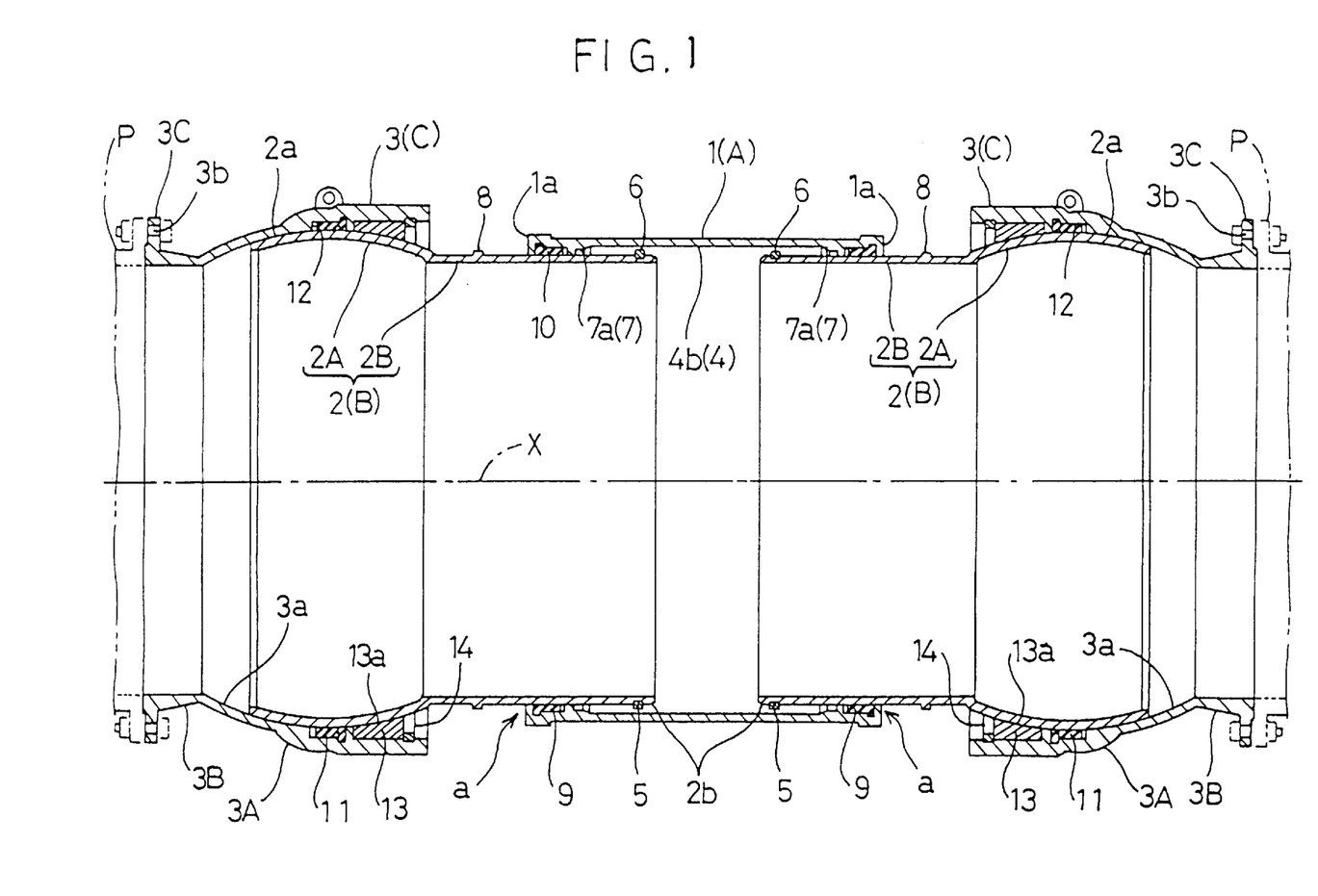
FIG. 1 is a vertical section view showing an entire flexible pipe connector according to a first preferred embodiment of the present invention.
Figure 2:
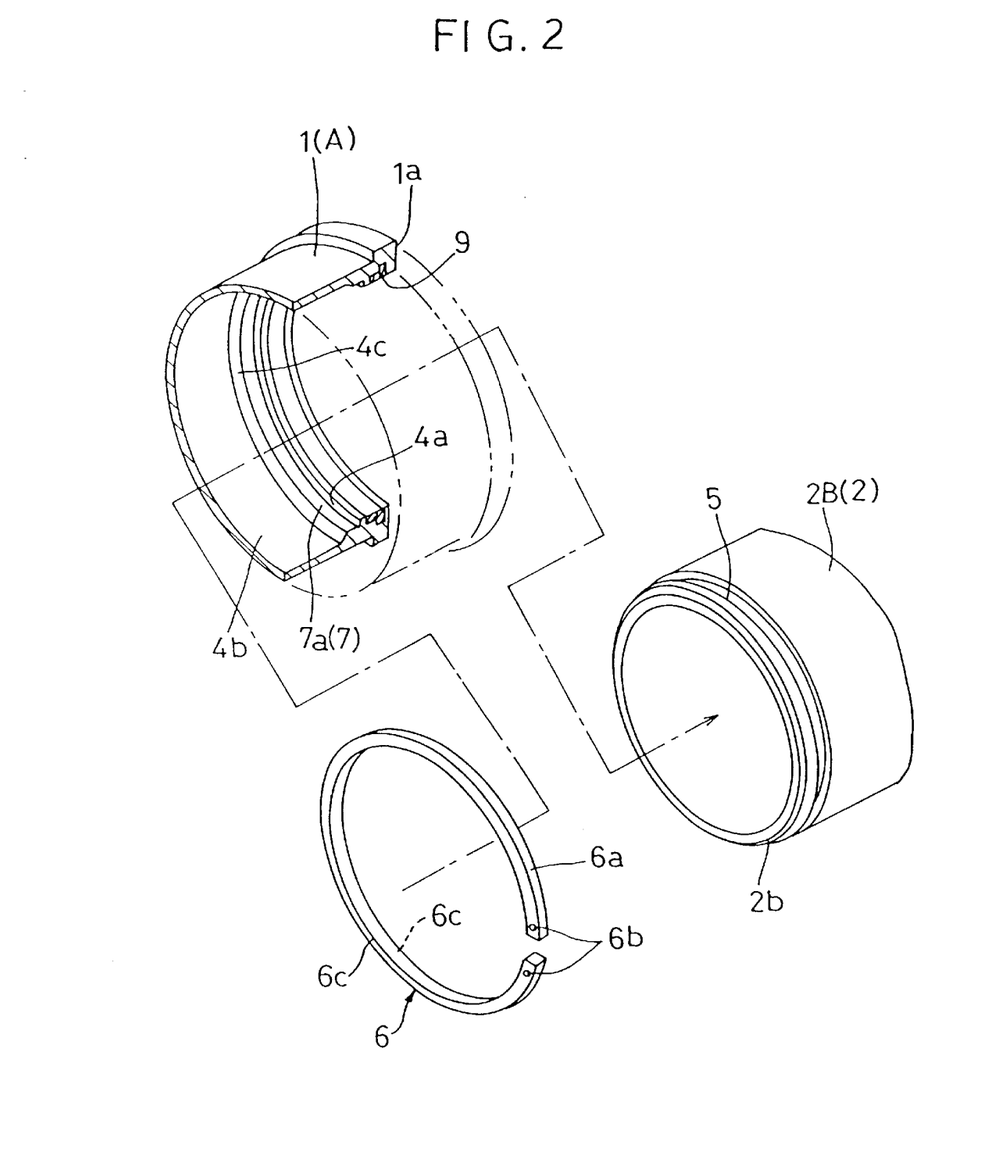
FIG. 2 is an exploded perspective view showing principal portions.
Figure 3A:
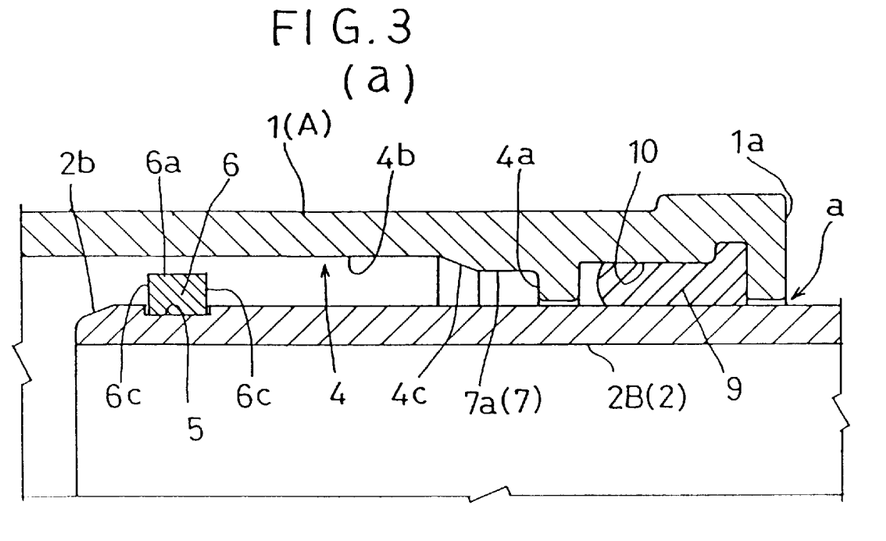
FIG. 3(a) is a section view showing the principal portions before application thereto of an external force in a withdrawing direction.
Figure 3B:
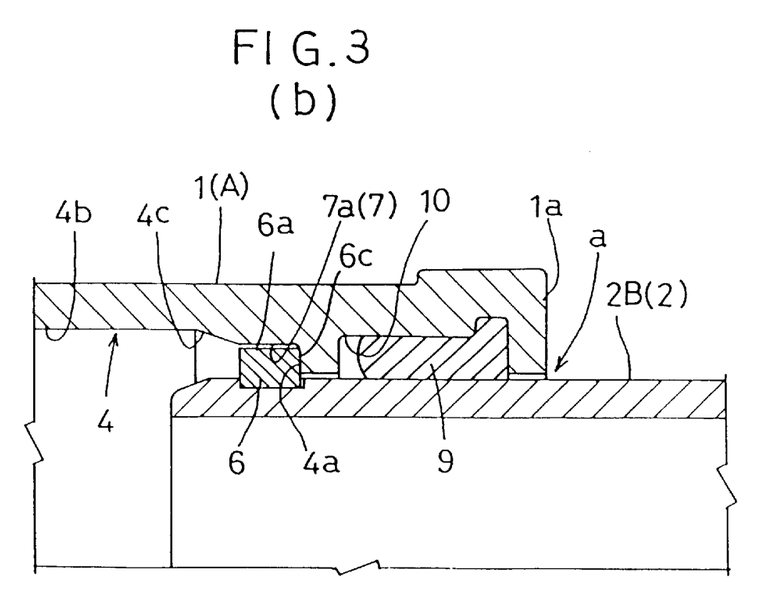
FIG. 3(b) is a section view showing the principal portions during application thereto of an external force in a withdrawing direction.

FIGS. 1 through 3 show a flexible pipe connector 1 for use in transport of fluid (e.g. tap water).

Into each of opposed ends of a first connector pipe made of cast iron as a first cylindrical member A, there is slidably inserted a second connector pipe 2 made of cast iron and forming, on the side of one end thereof, a partially spherical outer peripheral face 2a along a direction of cylinder axis X (cylinder axis direction). Further, on each of the outer peripheral face 2a of a spherical pipe portion 2A of the second connector pipe 2, there is slidably fitted a partially spherical inner peripheral face 3a formed at one end of a third connector pipe 3 made of cast iron and provided as a third cylindrical member C.

An annular attaching groove 5 is defined in the outer peripheral face of a straight pipe portion 2B of the second connector pipe 2. This attaching groove 5 has an axial length along the cylinder axis X shorter than an axial length of an annular restricting groove 4 defined at an intermediate portion in the cylinder axis direction X in the inner peripheral face of the first connector pipe 1. To each of these attaching grooves 5, there is detachably attached a retaining member 6 which is made of stainless steel and which is radially flexible. This restricting member 6 is brought into face contact with an end face 4a of the restricting groove 4 in the cylinder axis direction X, so as to restrict range of relative movement between the first connector pipe 1 and the second connector pipe 2 in the direction of cylinder axis X. And, a mutually opposing radial distance between the outer peripheral face of the straight pipe portion 2B of the second connector pipe 2 and the inner peripheral face of the first connector pipe 1 is designed so as to allow insertion and withdrawal of the retaining member 6. In other words, an annular space for allowing insertion/withdrawal of the retaining member 6 is formed between the opposing faces, i.e. between the outer peripheral face of the straight pipe portion 2B of the second connector pipe 2 and the inner peripheral face 4b of the restricting groove 4.

As shown in FIGS. 3(a), 3(b), there is formed a radial-expansion restricting portion 7. When an external force in the withdrawing direction generated in association with an earthquake or differential settlement is applied to the flexible pipe connector to cause the respective retaining member 6 fitted to the attaching groove 5 of the second connector pipe 2 to come into contact, along the cylinder axis X, against the end face 4a of the restricting groove 4 located on the side of the entrance opening (a) of the first connector pipe 1 (i.e. the side for allowing insertion of the second connector pipe 2), the radial-expansion restricting portion 7 functions to prevent, through contact, withdrawal of this restricting member 6 from the attaching groove 5 in the direction of cylinder axis X. Further, as shown in FIG. 1, the outer peripheral face of the straight pipe portion 2B of the second connector pipe 2 includes, as an integral projection thereof, an annular stopper portion 8. This annular stopper portion 8 comes into face contact with the end face 1a of the first connector pipe 1 in the direction of cylinder axis X when the first connector pipe 1 and the second connector pipe 2 are moved relative to each other beyond a predetermined movement range.

Each of the radial-expansion restricting portion 7 is constructed from a radial-expansion restricting face 7a formed adjacent one end of the inner peripheral face 4b of the restricting groove 4 in the vicinity of the outer peripheral face 6a of the retaining member 6 when contacting the end face 4a of the restricting groove 4. The outer peripheral face 6a of the retaining member 6 and the radial-expansion restricting face 7a are respectively formed parallel with or substantially parallel with the cylinder axis X.

Further, each of the end face 6c of the retaining member 6 in the direction of cylinder axis X and the opposed end faces 4a of the restricting groove 4 in the direction of cylinder axis X is formed as a flat face extending normal or substantially normal to the cylinder axis X. Of the inner peripheral face 4b of the restricting groove 4, a border portion 4c extending continuously from the radial-expansion restricting face 7a is formed as a tapered face.

An annular seal retaining groove 10 is formed adjacent each of opposed ends, in the direction of the cylinder axis X, in the inner peripheral face of the first connector pipe 1. This seal retaining groove 10 retains a first elastic sealing material 9 made of synthetic rubber material (e.g. styrene-butadiene rubber) for sealing between the inner peripheral face of the first connector pipe 1 and the outer peripheral face of the straight pipe portion 2B of the second connector pipe 2. The inner peripheral face 3a of the spherical pipe portion 3A of the third connector pipe 3 defines an annular seal retaining groove 12. This seal retaining groove 12 retains a second elastic sealing material 11 made of synthetic rubber material (e.g. styrene-butadiene rubber) for sealing between the inner peripheral face of the third connector pipe 3 and the outer peripheral face 2a of the spherical pipe portion 2A of the second connector pipe 2. Further, a connector flange 3C is formed integrally with the end of the straight pipe portion 3B of the third connector pipe 3. This connector flange 3C includes a plurality of connecting through holes 3b coaxially arranged for fixedly connecting a certain external piping device P such as a fluid transport pipe (e.g. water pipe) or a sluice valve by means of bolts and nuts.

On the inner peripheral face, in the vicinity of the entrance opening, of the spherical pipe portion 3A of the third connector pipe 3, there are attached a sliding guide member 13 made of cast iron and a stopper member 14 made of stainless steel. The sliding guide member 13 includes a partially spherical sliding face 13a for coming into sliding contact with the outer peripheral face 2a of the spherical pipe portion 2A of the second connector pipe 2. The stopper member 14 is constructed as a C-shaped member radially flexible for preventing inadvertent withdrawal of the sliding guide member 13.

The straight pipe portion 2B of the second connector pipe 2, defines, at the leading end thereof, a tapered face 2b adapted for guiding the retaining member 6 while radially expanding it. The retaining member 6 is constructed as a C-shaped ring member having one peripheral portion thereof cutaway, and at opposed free ends of this C-shaped member, there are formed radial-expansion operating holes 6b for allowing elastic radial expansion of the retaining member 6 by some appropriate tool.

In operation, when the first and second connector pipes 1, 2 un-withdrawably connected to each other via the retaining member 6 are subjected to an external force in the withdrawing direction due to an earthquake or differential settlement, these first and second connector pipes 1, 2 move relative to each other to the movable limit within the movable range defined by the length of the restricting groove 4, and the retaining member 6 fitted to the attaching groove 5 of the second connector pipe 2 comes into contact, along the direction of cylinder axis, against the one end face 4a of the restricting groove 4 located on the side of the entrance opening (a) of the first connector pipe 1.

In the course of the above, the portion of the retaining member 6 contacting against the one end face 4a of the restricting groove 4 of the first connector pipe 1 and the further portion of the retaining member 6 contacting against the end face of the attaching groove 5 of the second connector pipe 2 are radially displaced relative to each other. Further, the respective end faces 4a, 6c of the restricting groove 4 and the retaining member 6 are formed as flat faces extending substantially normal to the cylinder axis X. Thus, the retaining member 6 is twisted and pivoted in a direction where a diagonal direction of a cross section of this retaining member 6 is aligned with the cylinder radial direction, with using the portion of the retaining member 6 contacting the end face 4a of the restricting groove 4 of the first connector pipe 1 and the further portion of the retaining member 6 contacting the end face of the attaching groove 5 of the second connector pipe 2 as reaction points for the pivotal movement. In the course of this twisting pivotal movement, the retaining member 6 comes into contact with the radial-expansion restricting face 7a, whereby the retaining member 6 may be reliably prevented from being withdrawn from the attaching groove 5.

Further, even if subjected to such withdrawing external force of a significant magnitude under the above condition, as long as the sum of the amount of the radially outward elastic deformation of the portion of the first connector pipe on the side of the entrance opening (a) thereof and the radially inward elastic deformation of the inserted portion of the second connector pipe 2 does not exceed the length of the diagonal line of the cross section of the retaining member 6, the retention condition between the first and second connector pipes 1, 2 is not released.

When an external bending moment or shearing force is applied due to an earthquake or differential settlement in a direction transversing the cylinder axis X, by a relative sliding movement between the outer peripheral face 2a of the spherical pipe portion 2A of the second connector pipe 2 and the inner peripheral face 3a of the spherical pipe portion 3A of the third connector pipe 3 along their spherical configurations, the second connector pipe 2 and the third connector pipe 3 may be flexed relative to each other, thereby to restrict damage to the flexible pipe connector.

Further, when the second connector pipe 2 and the third connector pipe 3 have flexed to the maximum angle along the spherical configurations, the stopper portion 8 formed as a projection from the outer peripheral face of the straight pipe portion 2B of the second connector pipe 2 is designed so as to remain outside the flexion pivoting range of the opened end face of the spherical pipe portion 3A of the third connector pipe 3.

For this reason, even when an external force in the direction transversing the cylinder axis X is applied after application of the external force in the withdrawing direction, the stopper portion 8 prevents, through contact, the end face 1a of the first connector pipe 1 slidably radially retracting relative to the straight pipe portion 2B of the second connector pipe 2 from coming into the flexion pivotal range of the opened end of the spherical pipe portion 3A of the third connector pipe 3, so that the second connector pipe 2 and the third connector pipe 3 may always flex relative to each other to the maximum angle in a reliable manner.

[Second Embodiment]

Figure 4:
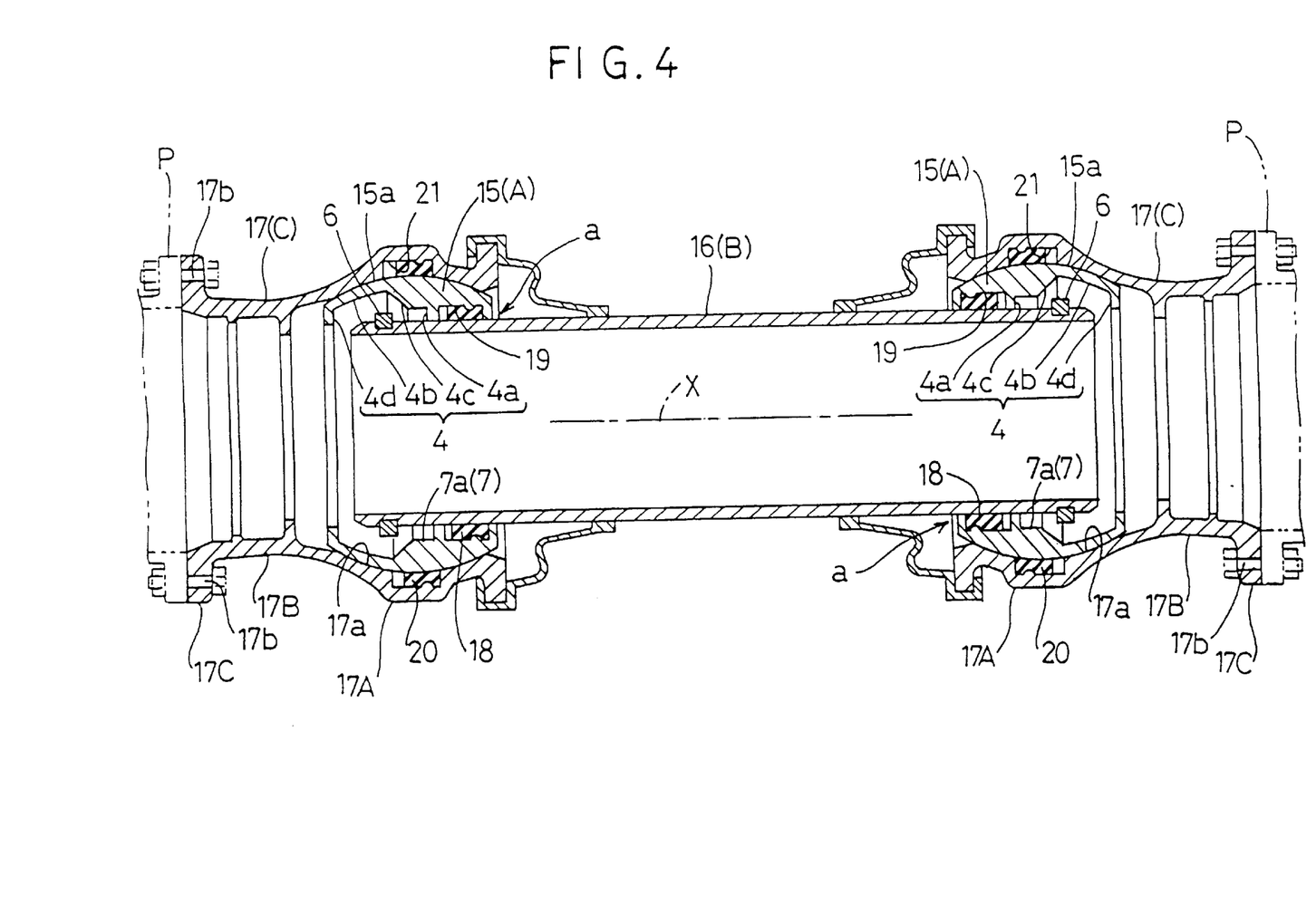
FIG. 4 is a vertical section view showing an entire flexible pipe connector according to a second preferred embodiment of the present invention.
Figure 5A:
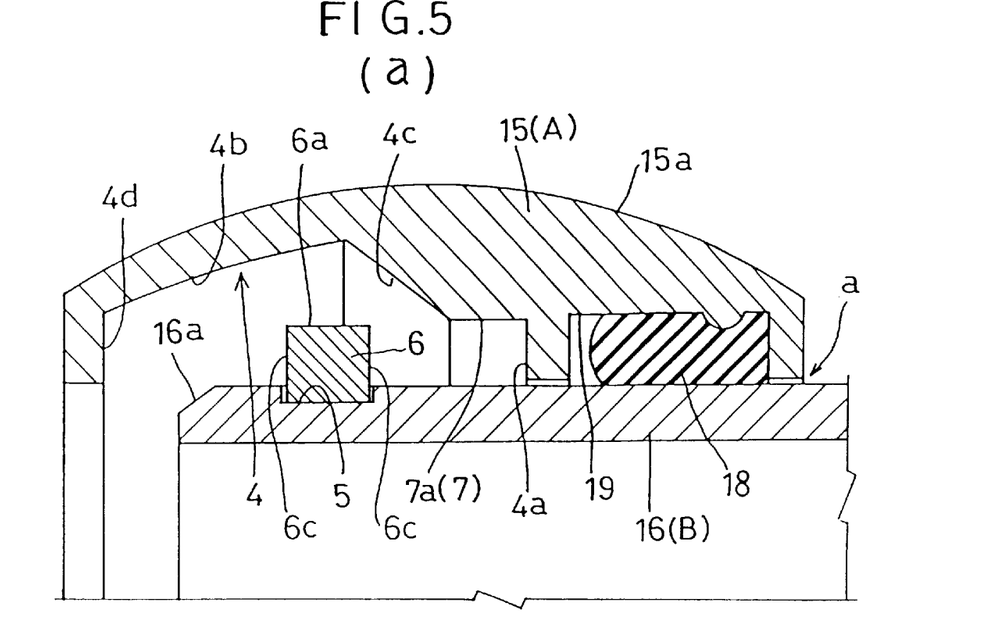
FIG. 5(a) is a section view showing the principal portions before application thereto of an external force in a withdrawing direction.
Figure 5B:
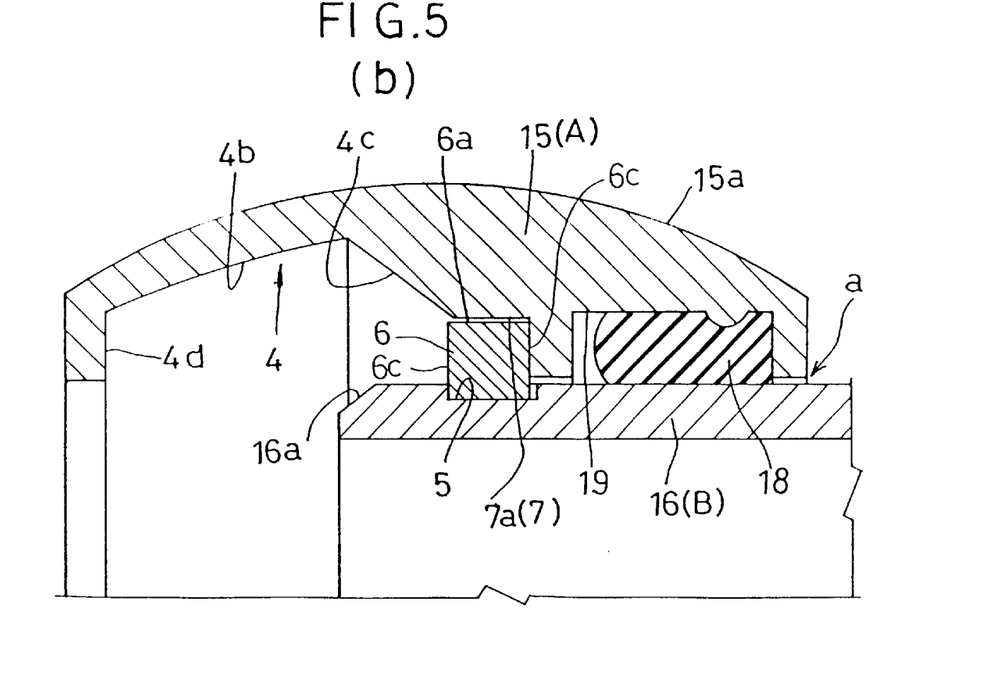
FIG. 5(b) is a section view showing the principal portions during application thereto of an external force in a withdrawing direction.

FIGS. 4 and 5 show a flexible pipe connector for use in transport of fluid (e.g. tap water). Each of opposed ends of a second connector pipe 16 in the form of a straight pipe made of cast iron as a second cylindrical member B is slidably inserted, in the direction of cylinder axis X, into a first spherical ring member 15 made of cast iron as a first cylindrical member A having a partially spherical configuration. And, on an outer peripheral face 15a of each spherical ring member 15, there is slidably fitted a partially spherical inner peripheral face 17a formed at one end of a third connector pipe 3.

An annular attaching groove 5 is defined at an end in the direction of cylinder axis X in the outer peripheral face of the second connector pipe 16. This attaching groove 5 has an axial length along the cylinder axis X shorter than an axial length of an annular restricting groove 4 defined at an intermediate portion in the cylinder axis direction X of the inner peripheral face of the spherical ring member 15. To each of these attaching grooves 5, there is detachably attached a retaining member 6 which is made of stainless steel and which is radially flexible. This retaining member 6 is brought into face contact with an end face 4a, 4d of the restricting groove 4 in the cylinder axis direction X, so as to restrict range of relative movement between the spherical ring member 15 and the second connector pipe 16 in the direction of cylinder axis X. And, a mutually opposing radial distance between the outer peripheral face of the second connector pipe 16 and the inner peripheral face 4b of the restricting groove 4 is designed so as to allow insertion and withdrawal of the retaining member 6. In other words, an annular space for allowing insertion/withdrawal of the retaining member 6 is formed between the opposing faces, i.e. between the outer peripheral face of the second connector pipe 2 and the inner peripheral face 4b of the restricting groove 4.

As shown in FIGS. 5(a), 5(b), there is formed a radial-expansion restricting portion 7. When an external force in the withdrawing direction generated in association with an earthquake or differential settlement is applied to the flexible pipe connector to cause the retaining member 6 fitted to the attaching groove 5 of the second connector pipe 16 to come into contact, along the cylinder axis X, against the end face 4a of the restricting groove 4 located on the side of the entrance opening (a) of the spherical ring member 15 (i.e. the side for allowing insertion of the second connector pipe 16), the radial-expansion restricting portion 7 functions to prevent, through contact, withdrawal of this restricting member 6 from the attaching groove 5 in the direction of cylinder axis X. When the external force due to an earthquake or differential settlement is applied to the flexible pipe connector to cause the spherical ring member 15 and the second connector pipe 16 to move relative to each other beyond a predetermined movement range, the retaining member 6 fitted to the attaching groove 5 of the second connector pipe 16 comes into face contact with the other end face 4d of the restricting groove 4 of the spherical ring member 15 along the direction of the cylinder axis.

Each of the radial-expansion restricting portion 7 is constructed from a radial-expansion restricting face 7a formed adjacent one end of the inner peripheral face 4b of the restricting groove 4 in the vicinity of the outer peripheral face 6a of the retaining member 6 when contacting the end face 4a of the restricting groove 4. The outer peripheral face 6a of the retaining member 6 and the radial-expansion restricting face 7a are respectively formed parallel with or substantially parallel with the cylinder axis X.

Further, each of the end face 6c of the retaining member 6 in the direction of cylinder axis X and the opposed end faces 4a, 4d of the restricting groove 4 in the direction of cylinder axis X is formed as a flat face extending normal or substantially normal to the cylinder axis X. Of the inner peripheral face 4b of the restricting groove 4, a border portion 4c extending continuously from the each radial-expansion restricting face 7a is formed as a tapered face.

An annular seal retaining groove 19 is formed adjacent each of opposed ends, in the direction of the cylinder axis X, in the inner peripheral face of the spherical ring member 15. This seal retaining groove 19 retains a third elastic sealing material 18 made of synthetic rubber material (e.g. styrene-butadiene rubber) for sealing between the inner peripheral face of the spherical ring member and the outer peripheral face of the second connector pipe 16. The inner peripheral face 17a of the spherical pipe portion 17A of the third connector pipe 17 defines an annular seal retaining groove 21. This seal retaining groove 21 retains a fourth elastic sealing material 20 made of synthetic rubber material (e.g. styrene-butadiene rubber) for sealing between the inner peripheral face of the third connector pipe and the outer peripheral face 15a of the spherical ring member 15. Further, a connector flange 17C is formed integrally with an end of the straight pipe portion 17B of the third connector pipe 17. This connector flange 17C includes a plurality of connecting through holes 17b coaxially arranged for fixedly connecting a certain external piping device P such as a fluid transport pipe (e.g. water pipe) or a sluice valve by means of bolts and nuts.

The outer peripheral face of the second connector pipe 16 includes, adjacent the leading end thereof, a tapered face 16a adapted for guiding the retaining member 6 while radially expanding it. The retaining member 6 is constructed as a C-shaped ring member having one peripheral portion thereof cutaway, and at opposed free ends of this C-shaped there are formed radial-expansion operating holes for allowing elastic radial expansion of the retaining member 6 by some appropriate tool.

In operation, when the spherical ring members 15 and the second connector pipe 16 which are un-withdrawably connected to each other via the retaining members 6 are subjected to an external force in the withdrawing direction due to an earthquake or differential settlement, these spherical ring members 15 and the second connector pipe 16 respectively move relative to each other to the limit within the movable range defined by the length of the restricting groove 4, and the retaining member 6 fitted to the attaching groove 5 of the second connector pipe 16 comes into contact, along the direction of cylinder axis, against the one end face 4a of the restricting groove 4 located on the side of the entrance opening (a) of the spherical ring member 15.

In the course of the above, the portion of the retaining member 6 contacting against the one end face 4a of the restricting groove 4 of the spherical ring member 15 and the further portion of the retaining member 6 contacting against the end face of the attaching groove 5 of the second connector pipe 16 are radially displaced relative to each other. Further, the respective end faces 4a, 6c of the restricting groove 4 and the retaining member 6 are formed as flat faces extending substantially normal to the cylinder axis X. Thus, the retaining member 6 is twisted and pivoted in a direction where a diagonal direction of a cross section of this retaining member 6 is aligned with the cylinder radial direction, with using the portion of the retaining member 6 contacting the end face 4a of the restricting groove 4 of the spherical ring member 15 and the further portion of the retaining member 6 contacting the end face of the attaching groove 5 of the second connector pipe 16 as reaction points for the pivotal movement. In the course of this twisting pivotal movement, the retaining member 6 comes into contact with the radial-expansion restricting face 7a, whereby the retaining member 6 may be reliably prevented from being withdrawn from the attaching groove 5.

Further, even if subjected to such withdrawing external force of a significant magnitude under the above condition, as long as the sum of the amount of the radially outward elastic deformation of the portion of the spherical ring member on the side of the entrance opening (a) thereof and the radially inward elastic deformation of the inserted portion of the second connector pipe 16 does not exceed the length of the diagonal line of the cross section of the retaining member 6, the retention condition between the spherical ring members 15 and the second connector pipe 16 is not released.

When an external bending moment or shearing force is applied due to an earthquake or differential settlement in a direction transversing the cylinder axis X, by a relative sliding movement between the outer peripheral face 15a of the spherical ring member 15 and the inner peripheral face 17a of the spherical pipe portion 17A of the third connector pipe 17 along their spherical configurations, the spherical ring member 15 and the third connector pipe 17 may be flexed relative to each other, thereby to restrict damage to the flexible pipe connector.

[Third embodiment]

Figures 6A, 6B:
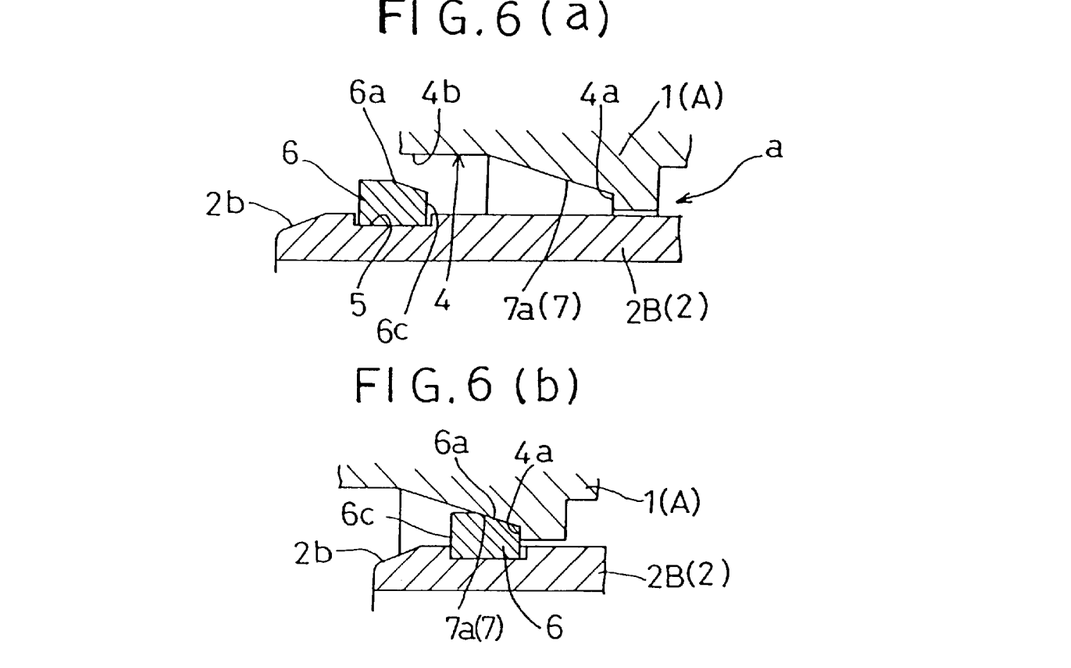
FIG. 6(a) is a section view showing the principal portions before application thereto of an external force in a withdrawing direction.
FIG. 6(b) is a section view showing the principal portions during application thereto of an external force in a withdrawing direction.

In the first embodiment described hereinbefore, each of the outer peripheral face 6a of the retaining member 6 and the radial-expansion restricting face 7a is formed as a flat face extending parallel with or substantially parallel with the cylinder axis X. Instead, as shown in FIGS. 6(a) and (b), each of at least a portion of the outer peripheral face 6a of the retaining member 6 and the radial-expansion restricting face 7a may be formed as a tapered face gradually reduced in diameter toward the entrance opening (a) of the first connector pipe 1 (i.e. the side for allowing insertion of the second connector pipe 2) to come into contact with or come close to the outer peripheral face 6a of the retaining member 6 when contacting the end face 4a of the restricting groove 4.

The rest of the construction is the same as the first embodiment and identical components are denoted with identical reference marks or numerals and will not be described.

Incidentally, each of at least a portion of the outer peripheral face 6a of the retaining member 6 and the radial-expansion restricting face 7a described in the second embodiment may be formed as a tapered face gradually reduced in diameter toward the entrance opening of the spherical ring member 15 (i.e. the side for allowing insertion of the second connector pipe 16) to come into contact with or come close to the outer peripheral face 6a of the retaining member 6 contacting the end face 4a of the restricting groove 4.

[Fourth Embodiment]

Figures 7A, 7B:
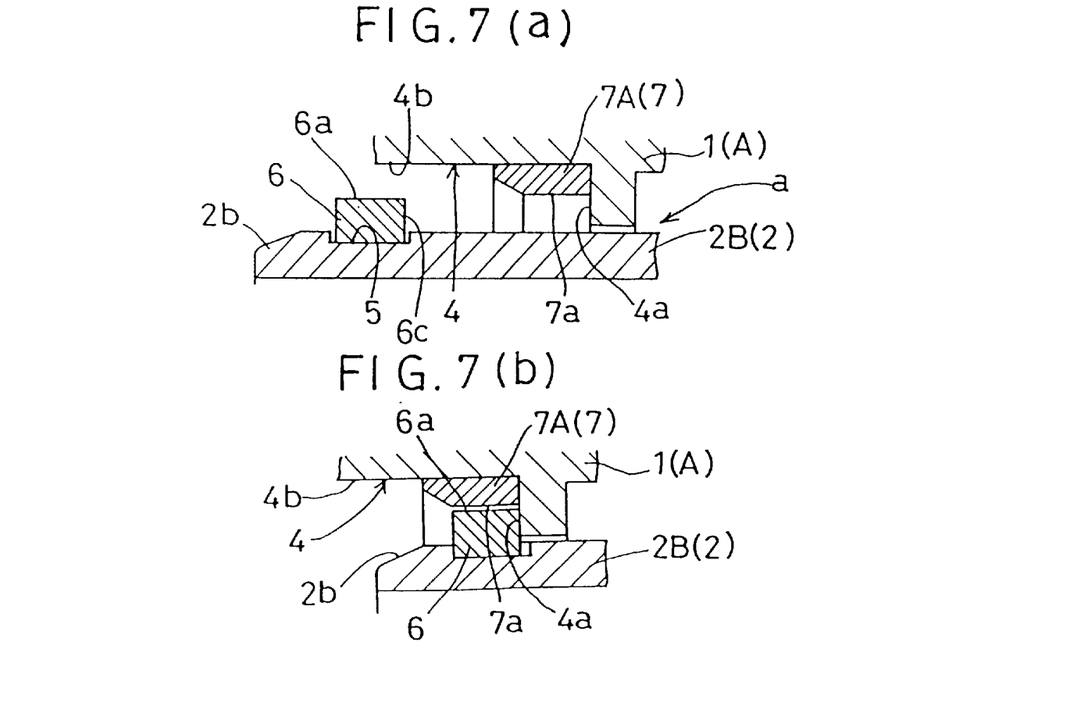
FIG. 7(a) is a section view showing the principal portions before application thereto of an external force in a withdrawing direction.
FIG. 7(b) is a section view showing the principal portions during application thereto of an external force in a withdrawing direction.

In the first embodiment described above, the radial-expansion restricting portion 7 is constructed from the radial-expansion restricting face 7a formed at one end of the inner peripheral face 4b of the restricting groove 4 in the vicinity of the outer peripheral face 6a of the retaining member 6 contacting the one end face 4a of the restricting groove 4. Instead, as shown in FIGS. 7(a), (b) and FIG. 8, the radial-expansion restricting portion 7 may be constructed from a radial-expansion restricting face 7a of the inner peripheral face of the restricting member 7A formed of stainless steel engaged and retained at one end of the inner peripheral face 4b of the restricting groove 4 for coming into contact with or coming closer to the outer peripheral face 6a of the retaining member 6 when contacting the one end face 4a of the restricting groove 4.

Figure 8:
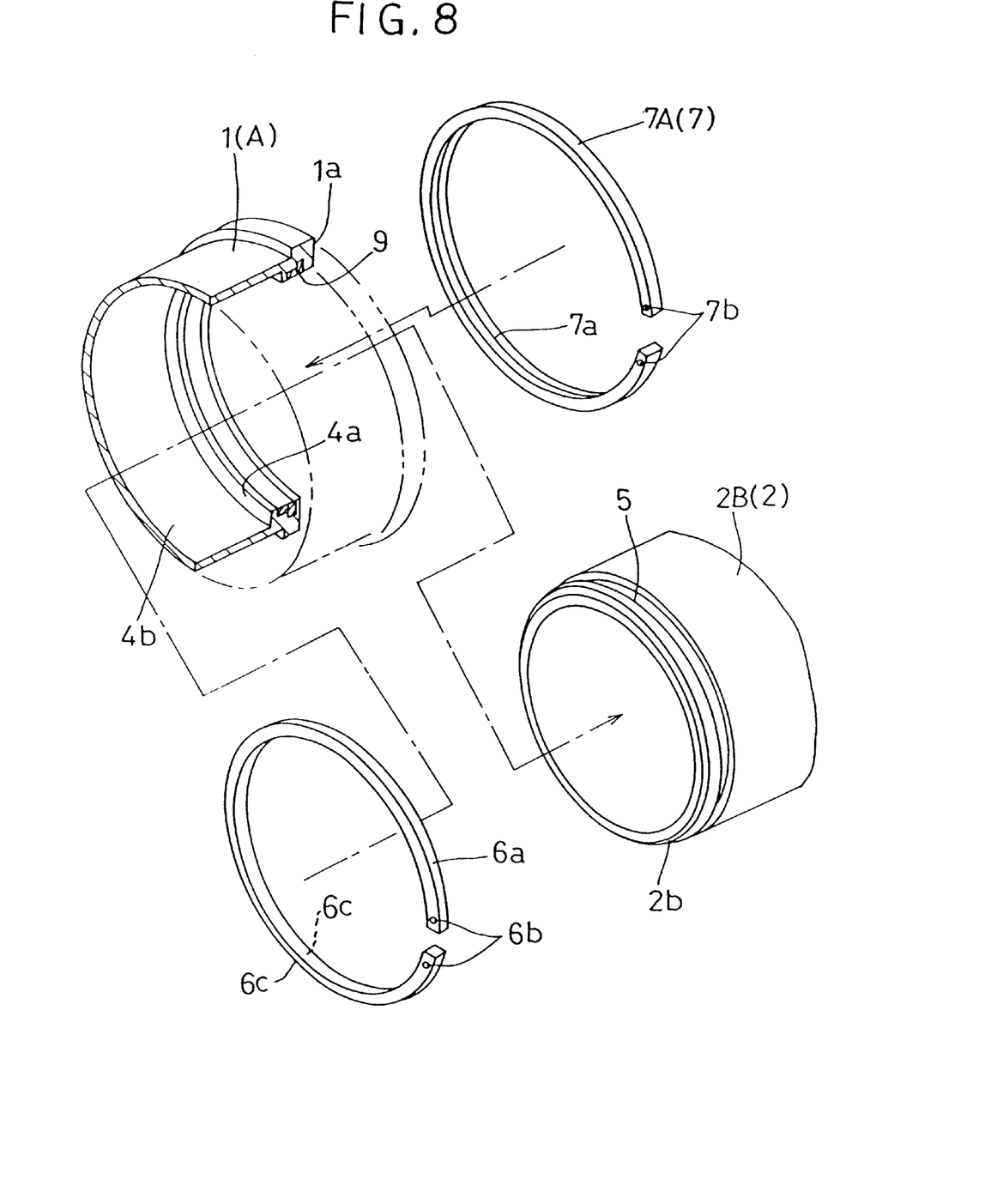
FIG. 8 is an exploded perspective view showing principal portions.

The restricting member 7A is comprised of an annular ring member having one peripheral portion thereof cutaway and this member 7A is capable of elastic deformation (bending deformation) radially inwards (radially reducing direction) and is engaged and retained, under the radially reduced condition, at the one end of the inner peripheral face 4b of the restricting groove 4.

At each free peripheral end of the restricting member 7A, there is defined a radial-reduction operating hole 7b for allowing this restricting member 7A to effect the radially reducing elastic deformation (bending deformation) by means of some appropriate tool.

The rest of the construction is the same as the first embodiment and identical components are denoted with identical reference marks or numerals and will not be described.

Incidentally, the radial-expansion restricting face 7a described in the second embodiment, like the above-described arrangement, may be constructed from a radial-expansion restricting face 7a of the inner peripheral face of the restricting member 7A formed of stainless steel engaged and retained at one end of the inner peripheral face 4b of the restricting groove 4 for coming into contact with or coming closer to the outer peripheral face 6a of the retaining member 6 when contacting the one end face 4a of the restricting groove 4.

[Fifth Embodiment]

Figure 9:
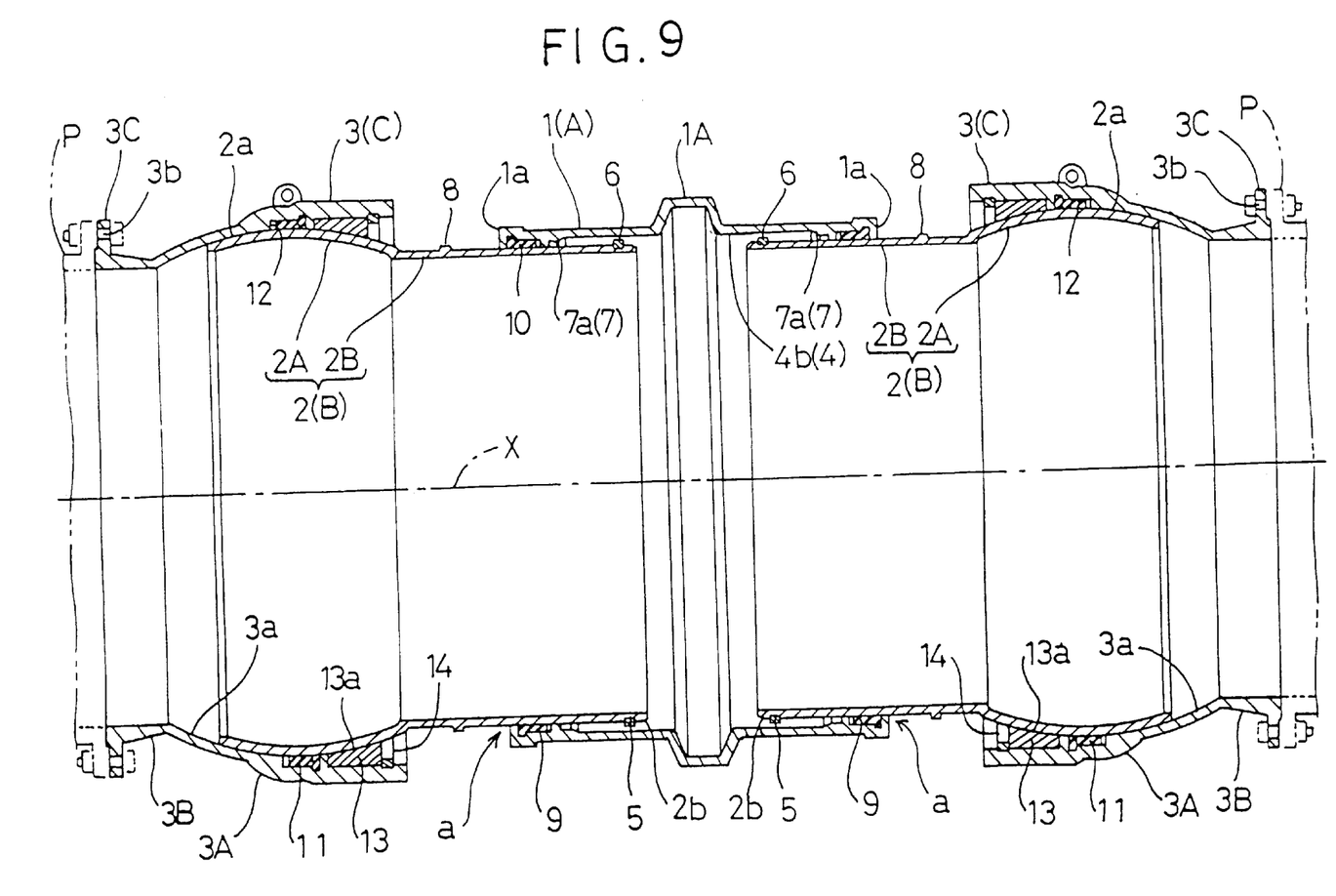
FIG. 9 is a vertical section view showing an entire flexible pipe connector according to a fifth preferred embodiment of the present invention.

FIG. 9 shows a construction in which a portion of the first connector pipe 1 described in the first embodiment is modified for improvement. Namely, in this first connector pipe 1, a portion 1A thereof located at an intermediate position of the restricting groove 4 in the direction of cylinder axis X is formed as a radially bulging portion.

With this construction of the fifth embodiment, in assembling this flexible pipe connector, when the straight pipe portion 2B of the second connector pipe 2 is inserted into the first connector pipe 1 to bring the leading end of the straight pipe portion 2B of the second connector pipe 2 to the bulging portion 1A of the first connector pipe 1, there is created a large annular space between the end side of the outer peripheral face of the straight pipe portion 2B of the second connector pipe 2 and the axially intermediate portion of the inner peripheral face 4b of the restricting groove 4. Accordingly, through this large annular space, the radially expanded retaining member 6 may be readily inserted from the leading end of the straight pipe portion 2B to the attaching groove 5 of the second connector pipe 2.

The rest of the construction is the same as the first embodiment and identical components are denoted with identical reference marks or numerals and will not be described.

[Sixth Embodiment]

Figure 10A:
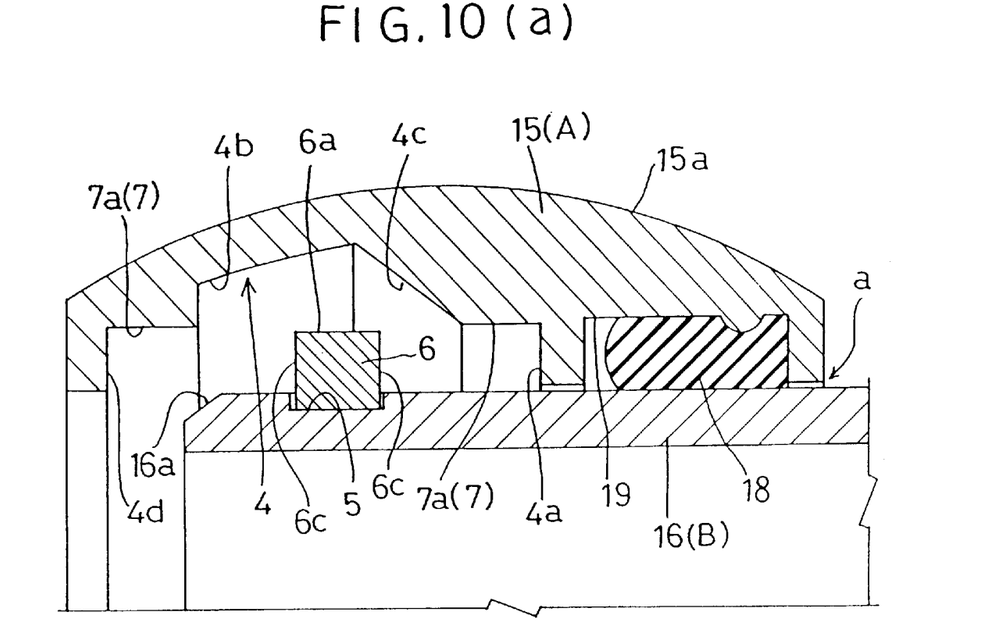
FIG. 10(a) is a section view showing the principal portions before application thereto of an external force in a withdrawing direction.
Figure 10B:
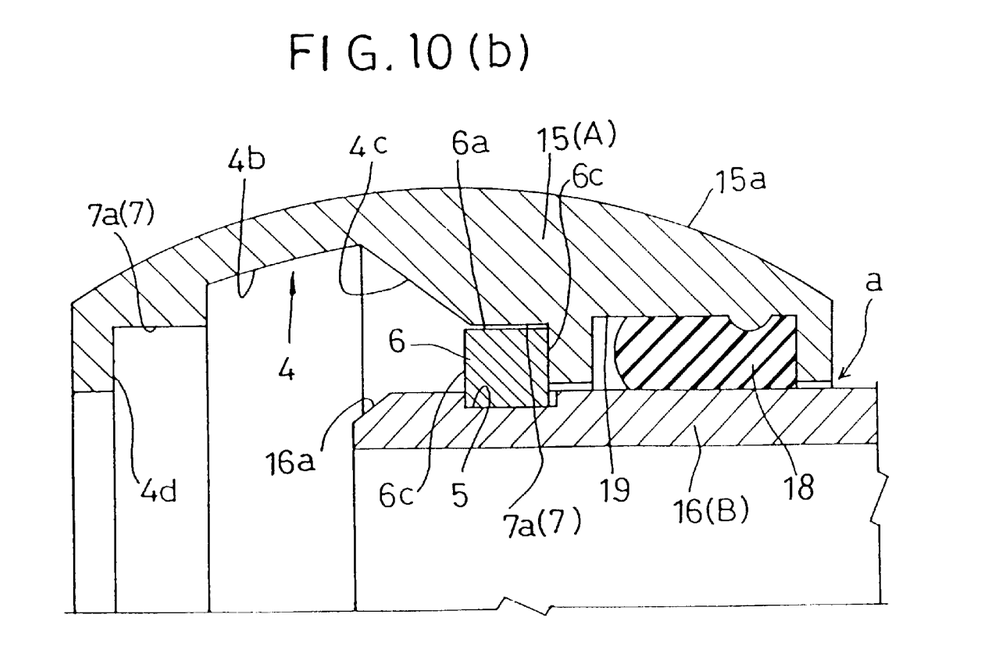
FIG. 10(b) is a section view showing the principal portions during application thereto of an external force in a withdrawing direction.

FIGS. 10(a) and (b) show improvement of the flexible pipe connector described in the second embodiment. In this, the radial-expansion restricting portion 7 is provided. This portion 7 prevents the restricting member 6 from being withdrawn from the attaching groove 5 when an external force in the withdrawing direction is applied to the flexible pipe connector due to an earthquake or differential settlement to cause the restricting member 6 fitted to the attaching groove 5 of the second connector pipe 16 to come into contact, along the direction of cylinder axis X, with the one end face 4a of the restricting groove 4 located on the side of the entrance opening (a) of the spherical ring member 15. Further, another radial-expansion restricting portion 7 is provided to the other end face 4d of the restricting groove 4 of the spherical ring member 15. This restricting portion 7 prevents the retaining member 6 from being withdrawn from the attaching groove 5 when an external force in the withdrawing direction is applied to the flexible pipe connector due to an earthquake or differential settlement to cause the restricting member 6 fitted to the attaching groove 5 of the second connector pipe 16 to come into face contact, along the direction of cylinder axis X, with the other end face 4d of the restricting groove 4 of the spherical ring member 15.

The radial-expansion restricting portions 7 constructed respectively from the radial-expansion restricting faces 7a formed at the opposed ends of the inner peripheral face 4b of the restricting groove 4 in the vicinity of the outer peripheral face 6a of the retaining member 6 contacting the end faces 4a, 4d of the restricting groove 4.

The rest of the construction is the same as the second embodiment and identical components are denoted with identical reference marks or numerals and will not be described.

[Seventh Embodiment]

Figure 11:
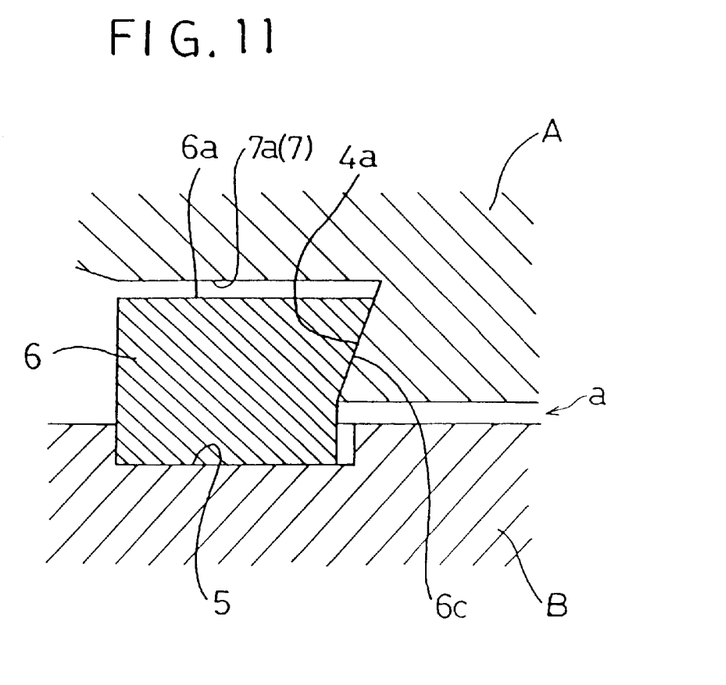
FIG. 11 is a section view showing principal portions of an flexible pipe connector according to a seventh preferred embodiment of the present invention.

In the foregoing respective embodiments, each of the end face 4a of the restricting groove 4 and the end face 6c of the retaining member 6 is formed as a face extending normal or substantially normal to the cylinder axis X. Instead, as shown in FIG. 11, at least a portion of the contacting faces, i.e. of the end face 4a of the restricting groove 4 of the first cylindrical member A (i.e. the first connector pipe 1 or the spherical ring member 15) and the end face 6c of the retaining member 6 fitted to the attaching groove 5 of the second cylindrical member B (i.e. the second connector pipe 2 or 16) may be formed as a tapered face extending radially outwards as approaching the entrance opening (a) of the first cylindrical member A.

The rest of the construction is the same as the foregoing respective embodiments and identical components are denoted with identical reference marks or numerals and will not be described.

[Other Embodiments]

(1) In the foregoing respective embodiments, the radial-expansion restricting portion 7 is constructed from a radial-expansion restricting face extending continuously in the peripheral direction. Instead, this portion 7 may be constructed from a plurality of discrete projections spaced apart from each other in the peripheral direction.

In short, the specific shape of the radial-expansion restricting portion 7 is not limited to those described above as long as this portion can prevent the restricting member 6 from being withdrawn from the attaching groove 5 when this restricting member 6 fitted to the attaching groove 5 of the second cylindrical member B comes into contact, along the direction of cylinder axis X, with the one end face 4a of the restricting groove 4 located on the side of the entrance opening (a) of the first cylindrical member A.

(2) In the fourth embodiment described hereinbefore, the restricting member 7A is engaged and retained at the one end of the inner peripheral face 4b of the restricting groove 4 by utilizing the elastic resilience in the radially expanding direction of the restricting member 7A per se which is being reduced radially. Instead, this restricting member 7A may be fixed to the one end of the inner peripheral face 4b of the restricting groove 4 by using a certain appropriate fixing means.

In case the restricting member 7A is fixed by means of such appropriate fixing means as bolts or welding, this restricting member 7A may be comprised of an annular ring member or of a plurality of discrete restricting elements slit apart from each other in the peripheral direction.

(3) In the foregoing respective embodiments, the flexible pipe connector is provided as an assembly of three components, i.e. the first cylindrical member A, the second cylindrical member B and the third cylindrical member C. However, the spirit of the present invention may be applied also to a different type of flexible pipe connector comprised of an assembly of two components, i.e. the first cylindrical member A and the second cylindrical member B.

(4) In the foregoing first through sixth embodiments, each of the end face 4a of the restricting groove 4 and the end face 6c of the retaining member 6 is formed as a face extending normal or substantially normal to the cylinder axis X. Instead, only mutual contacting portions of the end face 4a of the restricting member 4 and the end face 6c of the retaining member 6 may be formed respectively as such face extending normal or substantially normal to the cylinder axis X.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A flexible pipe connector, comprising:

a first cylindrical member;

a second cylindrical member inserted into the first cylindrical member, the second cylindrical member being supported by the first cylindrical member so as to be slidably movable relative to the first cylindrical member in a cylindrical axis direction;

an annular restricting groove defined in an inner peripheral face of the first cylindrical member, the restricting groove of the first cylindrical member having a pair of end faces facing each other in the cylindrical axis direction;

an annular attaching groove defined in an outer peripheral face of the second cylindrical member;

a retaining member fitted to the attaching groove for coming into contact with an end face of the annular restricting groove in the cylindrical axis direction so as to restrict a relative movement between the first and second cylindrical members in the cylindrical axis direction;

a pair of radial-expansion restricting faces defined in the restricting groove of the first cylindrical member, the radial-expansion restricting faces restricting a radial expansion of the retaining member via contact with an outer peripheral face of the retaining member in a radial direction so as to prevent a withdrawing movement of the retaining member from the attaching groove when the retaining member comes into contact with an end face of the restricting groove due to the relative slidable movement, wherein the first cylindrical member defines a space configured to allow insertion of the retaining member into the attaching groove and withdrawal of the retaining member from the attaching groove through radial-expansion of the retaining member, and wherein at least mutually contacting portions of the end faces of the restricting groove and an end face of the retaining member are formed as at least one of faces extending substantially normal to the cylindrical axis and tapered faces extending radially outwardly with respect to the adjacent entrance opening of the first cylindrical member.

2. A flexible pipe connector as defined in claim 1, wherein the radial-expansion restricting faces are located on restricting members engaged and retained in the restricting groove.

3. A flexible pipe connector as defined in claim 2, wherein the restricting members are radially deformable and are engaged and retained, under a radially reduced condition, at the ends of the inner peripheral face of the restricting groove.

4. A flexible pipe connector as defined in claim 1, wherein an intermediate portion of the restricting groove of the first cylindrical member relative to the cylinder axis is formed as a radially bulging portion.

5. A flexible pipe connector as defined in claim 1, including an additional second cylindrical member wherein the second cylindrical member include a spherical ring member made of cast iron, wherein the first cylindrical member includes a second connector pipe in the form of a straight pipe made of cast iron, wherein the second cylindrical members are slidably inserted into opposed ends of the first connector pipe, and wherein a partially spherical inner face is formed at one end of a third cylindrical member and is fitted on an outer peripheral face of at least one of the spherical ring members to be slidable relative thereto along the partial spherical shape thereof.

6. A flexible pipe connector as defined in claim 1, wherein the radial-expansion restricting faces are formed adjacent the ends of the inner peripheral face of the restricting groove, the outer peripheral face of the retaining member and the radial-expansion restricting faces being respectively formed at least substantially parallel with the cylinder axis.

7. A flexible pipe connector as defined in claim 1, including an additional second cylindrical member wherein a partial spherical face is formed at one end of each of the second cylindrical members and said second cylindrical members are inserted into each opposed ends of the first cylindrical member to be slidable relative thereto in the cylindrical axis direction, wherein a partially spherical inner face is formed at one end of a third cylindrical member and is fitted on an outer peripheral face of a spherical pipe portion of at least one of the second cylindrical members.

8. A flexible pipe connector as defined in claim 1, wherein a first elastic sealing member is retained on the first cylindrical member for forming a seal between the first cylindrical member and the second cylindrical member.

9. A flexible pipe connector as defined in claim 1, wherein an end face of the second cylindrical member defines a tapered face to guide the retaining member while radially expanding the same.

* * * * *

UNITED STATES PATENT AND TRADEMARK OFFICE
CERTIFICATE OF CORRECTION

PATENT NO. : 5,897,146
DATED : April 27, 1999
INVENTOR(S) : Kikuo Saito and Takashi Takeda It is certified that error appears in the above-indentified patent and that said Letters Patent is hereby corrected as shown below:

Column 1 Line 22 after "and" insert --withdrawal of the retaining member.--.

Column 12 Line 66 between "construction" and "in" delete hyphen --(-)--.

Column 16 Line 33 Claim 7 after "into" delete --each--.

Signed and Sealed this

Twenty-third Day of November, 1999

Attest:

Q. TODD DICKINSON

*Attesting Officer*  *Acting Commissioner of Patents and Trademarks*